United States Patent
Chen

(10) Patent No.: US 12,462,151 B2
(45) Date of Patent: Nov. 4, 2025

(54) GENERATING NEW MACHINE LEARNING MODELS BASED ON COMBINATIONS OF HISTORICAL FEATURE-EXTRACTION RULES AND HISTORICAL MACHINE-LEARNING MODELS

(71) Applicant: Adobe Inc., San Jose, GA (US)

(72) Inventor: Haichun Chen, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 1609 days.

(21) Appl. No.: 15/986,043

(22) Filed: May 22, 2018

(65) Prior Publication Data

US 2019/0362222 A1   Nov. 28, 2019

(51) Int. Cl.
| | |
|---|---|
| G06N 3/08 | (2023.01) |
| G06F 11/34 | (2006.01) |
| G06F 18/22 | (2023.01) |
| G06N 3/048 | (2023.01) |
| G06N 20/00 | (2019.01) |

(52) U.S. Cl.
CPC ........... *G06N 3/08* (2013.01); *G06F 11/3476* (2013.01); *G06F 18/22* (2023.01); *G06N 3/048* (2023.01); *G06N 20/00* (2019.01)

(58) Field of Classification Search
CPC .. G06N 3/0481; G06N 20/00; G06F 11/3476; G06K 9/6201
USPC .......................................................... 706/16
See application file for complete search history.

(56) References Cited

U.S. PATENT DOCUMENTS

| | | | |
|---|---|---|---|
| 6,243,696 B1* | 6/2001 | Keeler et al. | |
| 2009/0030746 A1* | 1/2009 | Etzioni et al. | |
| 2016/0132787 A1* | 5/2016 | Drevo | G06N 20/10 |
| | | | 706/12 |
| 2017/0140278 A1* | 5/2017 | Gupta et al. | |
| 2019/0188260 A1* | 6/2019 | Hewitt | G06F 40/268 |
| 2019/0286620 A1* | 9/2019 | Al-Haimi et al. | |

OTHER PUBLICATIONS

H₂O, "Open-Source Machine Learning Platform for Enterprises, H₂O Documentation", https://www.h2o.ai/ updated Jun. 7, 2018, accessed Jun. 11, 2018, 8 pages.
Datarobot, "Automated Machine Learning & Predictive Modeling Software", https://datarobot.com/, 2012, accessed Jun. 11, 2018, 4 pages.

* cited by examiner

*Primary Examiner* — Stephen S Hong
*Assistant Examiner* — Tionna M Burke
(74) *Attorney, Agent, or Firm* — Kilpatrick Townsend & Stockton LLP

(57) ABSTRACT

Techniques for generating new machine learning (ML) systems are described. In an example, a computer system receives a request specifying a task and a performance metric for the new ML model via a user interface. In response, the computer system dynamically generates new feature-extraction rules and new machine learning models based on a rule-model combination that would perform the specified task at a level meeting or exceeding the performance metric.

20 Claims, 9 Drawing Sheets

GENERATING NEW MACHINE LEARNING MODELS BASED ON COMBINATIONS OF HISTORICAL FEATURE-EXTRACTION RULES AND HISTORICAL MACHINE-LEARNING MODELS

TECHNICAL FIELD

This disclosure relates generally to computer-implemented methods and systems for machine learning. More specifically, this disclosure relates to generating new machine learning models by automatically searching for candidate machine-learning models and candidate feature-extraction rules that could be suitable for a specified task and iteratively evaluating different combinations of these candidate models and rules to develop a suitable model-and-rule combination for performing the specified task.

BACKGROUND

Machine learning (ML) models (e.g., a convolutional neural network, a regression model, a random forest tree, and a support vector machine) allow a computer system to learn from historical data and to perform a future task that involves circumstances or inputs similar to the historical data. ML models are used in applications such as, for example, image processing, object detection, speech recognition, user segmentation, etc. These ML models are designed by defining feature-extraction rules that are used to extract features from data, and then creating and refining the ML model to perform a desired task on the extracted features. Designing a specific ML model for an application is challenging in view of the wide range of possible applications, data, tasks, feature-extraction rules, and ML model types. Typically, the design is manual and is resource and time intensive, necessitating extensive knowledge and weeks, if not months, of development and testing.

Existing attempts to automate the design of ML models present disadvantages. One existing automation technique involves generating new combinations of previously defined feature-extraction rules and previously used ML models. For instance, if feature-extraction rules A and B were used with ML models A and B, respectively, a new combination is generated in which feature-extraction rule A is used with ML model B. However, this technique does not change the parameters of the feature-extraction rules or the ML models and, thus, does not actually generate a new ML model. Another existing approach modifies the parameters of a previously defined feature-extraction rules without changing the previously used ML model. For instance, if feature-extraction rule A was used with ML model A, the new design is a modified feature-extraction rule A with the same ML model A. This approach also does not actually generate a new ML model. The two existing techniques may produce sub-optimal results because the parameters of the ML model are not refined to a targeted application, data, or task.

SUMMARY

Certain embodiments involve generating machine learning (ML) models and feature-extraction rules. In an example, a computer system receives, from a client device, a request to generate a machine-learning model, wherein the request identifies a test interaction dataset and a task for the machine-learning model. The computer system identifies characteristics of the test interaction dataset by applying, to the test interaction dataset, a neural network trained to recognize, for example, one or more of metadata, datatypes, and data distributions in interaction datasets. The computer system matches historical interaction datasets to the characteristics identified with the neural network. Based on matching the test interaction dataset to the historical interaction datasets, the computer system selects historical machine-learning models, which were previously applied to the historical interaction datasets, and historical feature-extraction rules, which were previously used to extract portions of the historical interaction datasets as inputs to the historical machine-learning models.

The computing system generates an output machine-learning model from a combination of a feature-extraction rule from the historical feature-extraction rules and a machine-learning model from the historical machine-learning models. The output machine-learning model is generated based on the combination satisfying a performance metric included in the request. For example, the computing system could iteratively evaluate different combinations of historical machine-learning models and historical feature-extraction rules, and build the output machine-learning model from a model-and-rule combination that satisfies the performance metric. The computing system provides the client device with access to the output machine-learning model.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
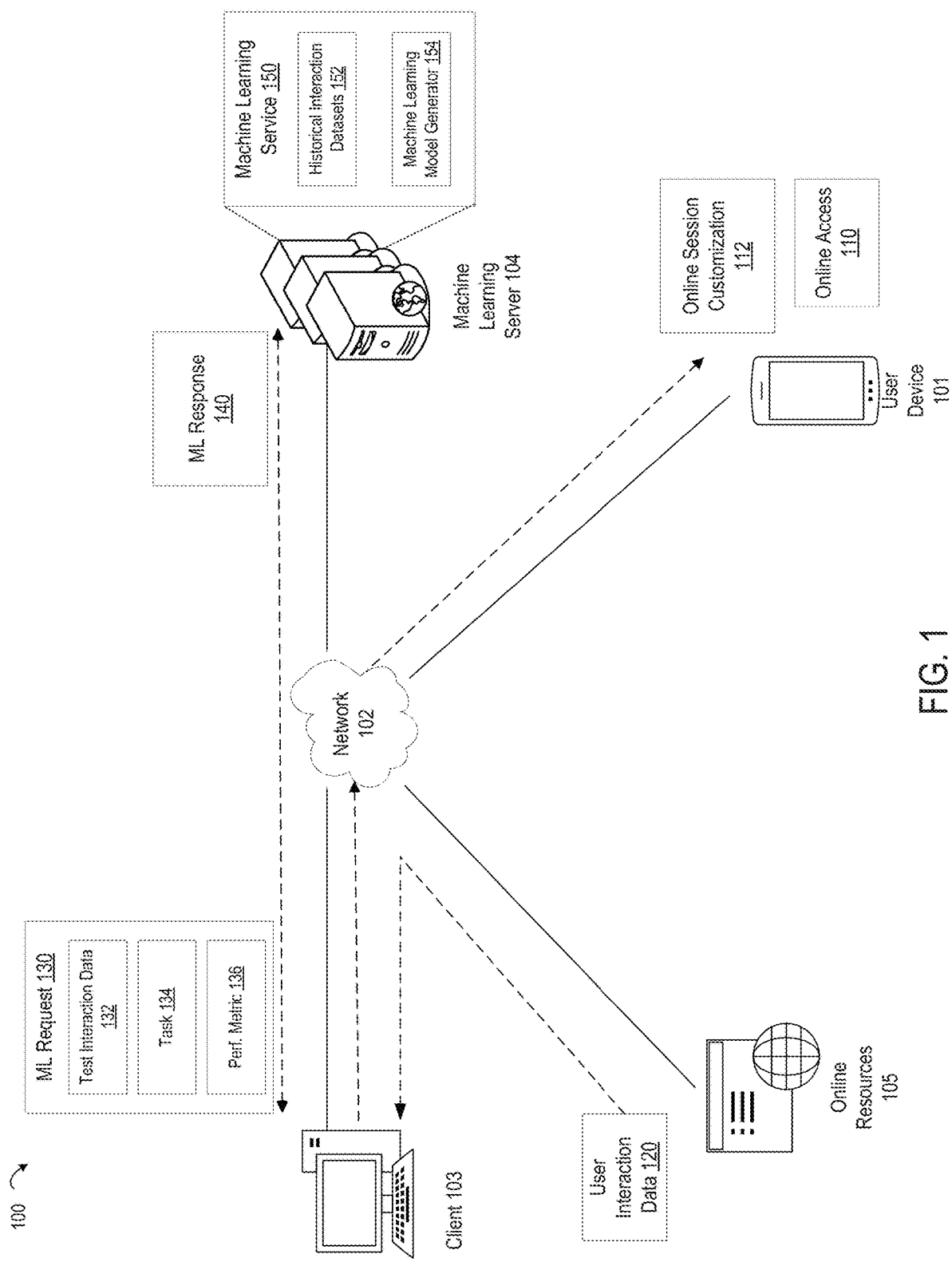
FIG. 1 depicts an example of a computing environment for building a machine-learning model from historical machine-learning models, according to certain embodiments of the present disclosure.

Embodiments of the present disclosure are involve automating the design of machine-learning (ML) models by automatically searching for candidate ML models and candidate feature-extraction rules that could be suitable for a specified task (e.g., predicting whether an email link will be clicked). For example, a computer system selects a historical ML model based on a user-specified task to be performed by the ML model, and a targeted performance metric of the ML model. The computer system iteratively evaluates different combinations of these candidate models and rules, which can include updating various model parameters, to develop a suitable model-and-rule combination for performing the specified task. A high-performing combination of a particular candidate ML model (which can have updated parameters) and a candidate feature-extraction can be provided to a client device that requested a new ML model.

The following non-limiting example is provided to introduce certain embodiments. To search for suitable candidate models, a model-building server receives a model-generation request that specifies a particular task and a test interaction dataset having interaction data collected from multiple user devices (e.g., clickstream data from user devices that received various emails). The model-building server then identifies historical interaction datasets that are similar the test interaction dataset. One or more neural networks are used to compute this similarity based on, for example, types of metadata, content, datatypes, etc. in the two test interaction dataset and a historical interaction dataset. The model-building server also selects historical ML models that have been applied to these historical interaction datasets, which can be filtered based on which historical ML models have been used to perform the specified task. Using these historical ML models, the model-building server also retrieves historical feature-extraction rules that selected certain columns of a historical interaction dataset as inputs for a historical ML model. For instance, a feature-extraction rule for a particular model might select, from an interaction dataset of 100 columns, a "clicks" column and an "age" column because "clicks" and "age" are used by the model to predict a probability of clicking a link.

In this manner, if a historical interaction dataset is similar to the test interaction dataset from the model-generation request, then the model-building server retrieves a historical ML model and feature-extraction rule that were previously applied to the historical interaction dataset, since these retrieved items could be useful for performing the prediction task from the model-generation request. The model-building server finds these historical interaction datasets by using a deep-learning technique (e.g., a neural network) to recognize certain characteristics of the test interaction dataset (e.g., both datasets having similar types or distributions of data values) and retrieve the historical interaction datasets having similar characteristics. Doing so reduces the manual effort in the model-building process, since the deep-learning technique can automatically recognize which historical interaction datasets look similar to the test interaction dataset, even if the historical interaction datasets uses different headers than the test interaction dataset. The model-building server then uses the historical interaction datasets to retrieve ML models (which were historically applied to the historical interaction datasets) and feature-extraction rules (which identified the features of the historical interaction datasets to which the ML models were applied).

Continuing with this example, the model-building server has now retrieved candidate feature-extraction rules and candidate ML models, which are subsequently used to develop a suitable model for the specified task. To do so, the model-building server iteratively tests different model-and-rule combinations of (i) a candidate ML model and (ii) a candidate feature-extraction rule. Each test involves applying each model-and-rule combination to the test interaction dataset. The testing process can include varying the parameters of a given candidate ML model and using different model-and-rule combinations (even if a particular feature-extraction rule was not historically used for a particular model). The model-building server selects one or more model-and-rule combination that meet a performance metric (e.g., "accuracy of 90%") included the model-generation request. The model-building server responds to the model-generation request by making the selected ML model and feature-extraction rule available for download or otherwise providing access to the selected model-and-rule combination.

Relative to existing manual approaches, the embodiments significantly reduce the effort and time involved in creating ML models suitable for performing a given task. For example, it is sufficient to specify a task and a performance metric for the new ML model via a user interface. Within hours, the new design becomes available via the user interface. Relative to existing automation approaches, the embodiments dynamically generate new feature-extraction rules and new ML models and search for a feature-extraction rule-ML model combination that would allow performing the task at a level meeting or exceeding the performance metric. Depending on the number of possible combinations, the search need not be exhaustive, thereby reducing or minimizing the impact to the computational overhead for finding an optimal combination.

As used herein, an "interaction dataset" refers to a set of data about user interactions with, for example, online resources. A "user interaction" refers to an interaction of an end user with an online resource via an end user device. For instance, the user operates the end user device to access the online resource. The access (or lack thereof) results in interaction data that can be collected by a collection server. Clickstream data is an example of user interaction data. An "online resource" represents a computing resource that is accessible to an end user device over a data network. A web site hosted on a web server is an example of an online resource.

As used herein, a "task" of an ML model refers to a prediction generated by the ML model based on a dataset or an insight provided by the ML model about the prediction. For example, the ML model predicts a user conversion given clickstream data. The user conversion prediction is a task in this example.

As used herein, a "performance metric" refers to a measurable value that quantifies the ability of an ML model to perform one or more tasks. Accuracy, precision, and recall, when measured, are examples of a performance metric.

As used herein, a "feature-extraction rule" is a rule that specifies one or more rule parameters for extracting features from a dataset. The features are used by an ML to perform a task. A rule parameter is a parameter specific to the rule and has a value specific to the extraction of the feature.

As used herein, a "model parameter" is a hyperparameter that relates to a structure or property of an ML model. For example, for a random forest ML model, tree depth, number of trees, number of leaves per tree are examples of a model parameter.

As used herein, a "parameter" of a combination of a feature-extraction rule and a ML model refers to a rule parameter of the feature-extraction rule or to a model parameter of the ML model.

Referring now to the drawings, FIG. 1 depicts an example of a computing environment 100 for determining an optimal ML model and feature-extraction rule. As illustrated, the computing environment 100 includes a user device 101, a data network 102, a client 103, an ML server 104, and online resources 105. The user device 101 accesses (illustrated as online access 110) the online resources 105 over the data network 102. This online access 110 results in user interaction data 120 that can be collected by a collection server (not shown) or the client 103. The client 103 submits a request 130 to the ML server 104 over the data network for an ML model based on this and other user interaction data collected for other user devices. In response, the ML server 104 returns to the client 103 a ML response 140 including information such as a specific ML model and a feature-extraction rule. The client 103 can use the ML model and the feature-extraction rule to, for example, customize an online session of the user device 101 (shown as online session customization 112) given its user interaction data 120 (or additional user interaction data 120 specific to the user device 101).

In an example, the user device 101 is an end user device, such as a smart phone, smart wearable device, internet capable mobile device, laptop computer, desktop computer, or other devices configured to access the online resources 105 over the data network 102. The online access 110 can be through a mobile connection, wireless connection, or tethered internet connection.

The client 103 is generally associated with an operator, whereas the ML server 104 is associated with a service provider. In an example, the operator is a customer of the service provider and may have, for example, a subscription to various computing services provided by the service provider including a ML service 150. In this example, the client 103 can be a computing device, such an as end user device or a server available to the operator. The ML server 104 is a set of hardware or visualized computing resources or within, for instance, a datacenter and supports some or all of the computing services. The ML server 104 can be a single server configured to apply the ML service 150 to the received request 130. Alternatively, the ML server 104 can be multiple servers as part of a distributed computing environment.

In an example, the request 130 from the client 103 to the ML server includes test interaction data 132 and specifies a task 134 and a performance metric 136. The test interaction data 132 can include user interaction data 120 of the user device 101 and user interaction data for other user devices collected based on online accesses of these devices to the online resources 105 and other computing resources. The task 134 can include a specification of the desired outcome of the requested ML model. For instance, the task 134 specifies that the ML model should "predict whether a user will click on an email link." The performance metric 136 can be any suitable metric applicable to ML model including but not limited to: "accuracy—90%," "precision rate—80%," "recall rate—70%," or another metric.

The ML server 104, which can be a model-building server, provides the ML service 150 to the client 103 in response to the request 130. In some embodiments, the ML service 150 is a computing service that stores historical interaction datasets 152 and invokes a ML model generator 154. The historical interaction datasets 152 include interaction datasets received from the client 103 and other clients. Historical feature-extraction rules and historical ML models applied to these historical interaction datasets, values for the rule parameters of the historical feature-extraction rules, and hyperparameters and performance metrics of the historical ML models can also be stored with the historical interaction datasets 152. The ML model generator 154 generates the ML model and feature-extraction rule identified in the ML response 140 based on the test interaction data 132, the task 134, and the performance metric 136 from the request 130 and based on the historical interaction datasets 152, as further described in connection with the next figures. The ML model and feature-extraction rule can be stored in the historical interaction datasets 152 and used to respond to future requests for ML models.

Figure 2:
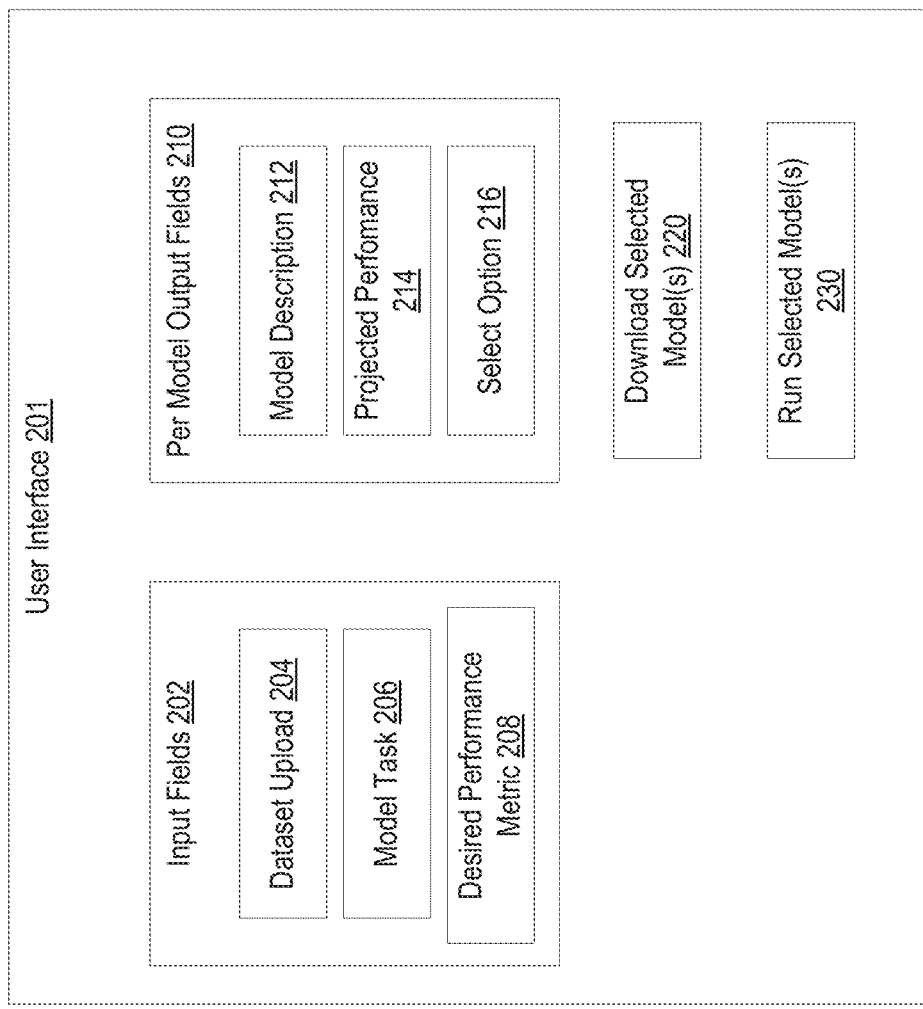
FIG. 2 depicts an example of a graphical user interface for receiving input information, and outputting data from a machine learning model determination application, according to certain embodiments of the present disclosure.

FIG. 2 depicts a schematic diagram of an interface for receiving input information, and outputting data provided by the ML server 104, according to certain embodiments of the present disclosure. As illustrated, the interface is a graphical user interface (GUI) 201. The GUI 201, can be provided by the ML server 104 via a remote interface (website) or as a deployable application to a presentation device, such as the client 103. In some embodiments, the GUI 201 includes two regions: input fields 202 and per model output fields 210. Other implementations or number of regions are possible. The input fields 202 can be a group of fields capable of receiving input of an operator via an input device, such as a keyboard, mouse, speech recognition device, or other input device suitable for receiving the input. For instance, the operator may specify a dataset upload 204, a model task 206, and a desired performance metric 208. In some embodiments, the dataset upload 204 can be a field which accepts any form of data structure, such as databases, tables, sequences, and other formats. The model task 206 may be a free form text field or which allows specification of what task the ML model should be designed to perform. The desired performance metric 208 can be a metric and its value associated with the performance of the ML model.

Additionally or alternatively, the model task 206 can a selection from a list of model tasks, a radio button selection, or a different type of input such as metadata included in the dataset upload 204. The desired performance metric 208 can be a selection from a list, with a slider to specify value of the desired performance metric 208.

In some embodiments, per model output fields 210 provides the ML response 140 from the ML server 104 based on the received inputs from the input fields 202. In an example, the ML server 104 can identify and recommend multiple ML models and feature-extraction rules based on the inputs. Accordingly, the per model output fields 210 can be replicated to identify the different recommendations. Alternatively, a list form, collapsible list form, or other arrangement can be used to present the multiple recommendations on the GUI 201.

The per model output fields 210 include a model description 212, a projected performance 214, and a selection option 216. The model description 212 describes the ML model and the feature-extraction rule. The ML model description identifies the type of the ML model and its hyperparameters. The projected performance 214 is the performance metric of the ML model measured by applying the ML model to the test interaction dataset uploaded via the dataset upload 204 according to the feature-extraction rule. Additionally or alternatively, the projected performance 214 is the difference between this performance and the desired performance metric 208 or a qualitative indication of this difference (e.g., exceeds or not). The selection option 216 can be a button, or check box, or other field that allows for user selection of the ML model and the feature-extraction rule.

Further, the GUI 201 presents a download selected model 220 option can be included. The download selected model 220 can be a selection box or button, or similar field for receiving a user selection to download all of the recommended ML models and feature-extraction rules that were selected by the operator under the selection option 216. A selection of the download selected models 220 triggers the ML server 104 to transmit the selected model and feature-extraction rules to the client 103 (or to a specified network location, where the address of this network location can be entered in an input field (not shown) of the GUI 201). In this way, the client 103 has access to these models and rules and can use them to perform the model task.

Additionally, the GUI 201 presents a run selected model (s) 230 option. This option, when selected, allows the client 103 to run the selected ML modes and feature-extraction rules on the ML server 104 for the dataset upload 204 (or another dataset upload 204) and receive the output of performing the task (e.g., predictions about whether users will open the email links or not) back from the ML server 104.

Figure 3:
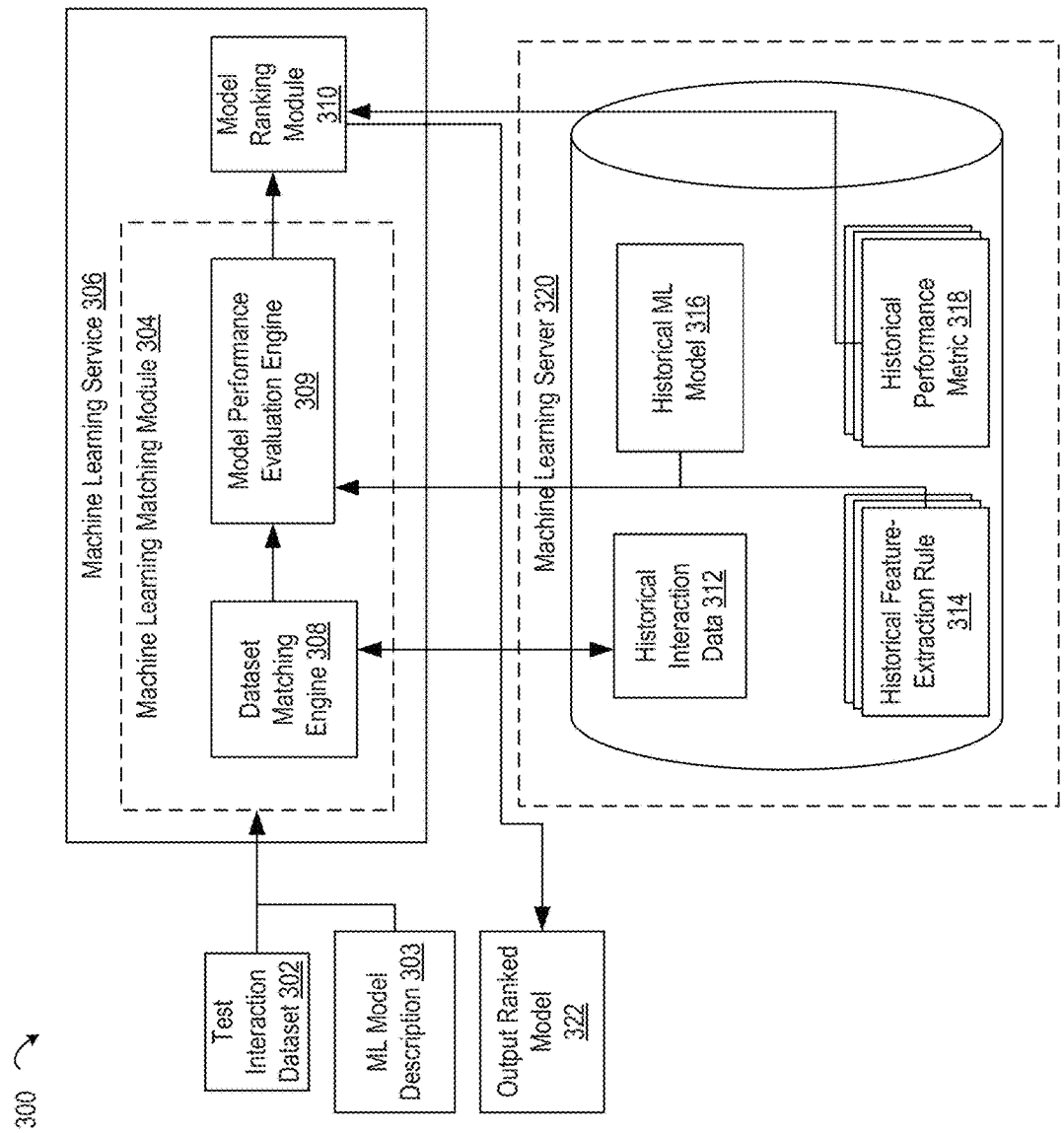
FIG. 3 depicts a more detailed example of a computing environment for building a machine-learning model from historical machine-learning models, according to certain embodiments of the present disclosure.

FIG. 3 depicts an example of a computing environment for determining an optimal ML model using historical interaction datasets, according to certain embodiments of the present disclosure. For example, test interaction dataset 302 and an ML model description 303 for an ML model may be received by an ML service 306. The test interaction dataset 302 can be included in a test interaction dataset and the ML model description 303 can be included in a request for the ML model. As illustrated, the ML service 306 uses a ML matching module 304 to determine which historical machine-learning models are appropriate for the test interaction dataset 302. The ML matching module 304 relies on a dataset matching engine 308 to search the historical interaction data 312 (e.g., historical interaction datasets) for a match to the test interaction dataset 302 (e.g., to the test interaction dataset). In some embodiments, the historical interaction data 312 are stored on a ML database hosted by or accessible to a ML server 320. The ML database may be remotely accessed by the dataset matching engine 308. In additional or alternative embodiments, the ML server 320 can host the ML service 306.

Generally, the historical interaction data 312 is stored according to a shared schema describing the organization of the table, such as by identifying columns, column headers, column descriptions, tables, relationships, sequences, object types, classes, or other information. This schema is referred to as shared schema because the historical interaction data may be obtained from or for different clients in different schemas and then reformatted into the shared schema.

The dataset matching engine 308 performs searches to match the test interaction dataset 302 with some of the historical interaction data 312 based on datatype, schema, or metadata of the test interaction dataset 302. Different types of searches are possible based on the test interaction dataset 302. In one example, the test interaction dataset 302 has a schema that can be processed to identify columns, column headers, column descriptions, and the like. In this case, the dataset matching engine 308 matches the columns, column headers, column descriptions, etc. with the corresponding elements of the shared schema of the historical interaction data 312. The dataset matching engine 308 can use a neural network trained to perform such matching. In another example, the test interaction dataset 302 does not have a well-defined schema (e.g., the column headers and column descriptions do not provide sufficient information about the entries in the columns). In this case, the dataset matching engine 308 matches the entries in the test interaction dataset 302 (e.g., the entries in the cell) or from any metadata of the test interaction dataset 302 with the corresponding entries from the shared schema of the historical interaction data 312. Here also, the dataset matching engine 308 can use a neural network trained to perform such matching.

The dataset matching engine 308 may provide all suitable matches of the historical interaction data 312 to a model performance evaluation engine 309. The model performance evaluation engine 309 may search an ML database hosted by the ML server 320 for a historical feature-extraction rule 314 and a historical ML model 316 applied to a portion of the matches historical user interaction data (e.g. the portion corresponding to a single historical interaction dataset). This processes is repeated for the different portions of the historical interaction data 312 to create a candidate rule set of historical feature-extraction rules and a candidate ML set of historical ML models. The ML database may also store the parameters and their values for each of the historical feature-extraction rules and, similarly, a description of the task and the hyperparameters and their values for the historical ML model.

In some embodiments, the model performance evaluation engine 309 may filter out some of the found historical ML models from the candidate ML set to create a candidate ML subset based on the ML model description 303. In an example, the ML model description 303 specifies a performance metric. Any found that ML model that does not have a better performance (available from the ML database) than the specified performance metric, this historical ML model is filtered out. In a further example, the filtering is relaxed such that the remaining subset of historical ML models is over-inclusive. Rather than meeting or exceeding the specified performance metric, the filtering can set a lower performance threshold as a function of the specified performance metric (e.g., 90% of the specified performance metric) and use that threshold for the filtering.

The model performance evaluation engine 309 may provide the candidate rule set and the candidate ML subset to a model ranking module 310. The model ranking module 310 may access a historical performance metric 318 from ML database for each of the historical ML models in the subset. In some embodiments, the model ranking module 310 generates combinations of feature-extraction rule and historical ML model from the candidate rule set and candidate ML subset. Each combination includes a historical feature-extraction rule and a historical ML model, where this rule and this model may, but need not, have been used together before. The model ranking module 310 processes the test interaction dataset 302 through each combination by extracting features from the test interaction dataset 302 according to the historical feature-extraction rule of the combination and performing the task on the test interaction dataset 302 by the historical ML model of the combination according to the features. The model ranking module 310 estimates the performance metric of this combination and compares to the performance metrics of the other combinations. The different combinations are then ranked based on their performance metrics. The model ranking module 310 outputs an output ranked model 322 of these combinations.

In an example, the performance metric estimated for each combination is a maximum of the performance metric for the combination. Estimating the maximum performance metric for a combination can be an iterative process. In particular, the model ranking module 310 access the values for the parameters of the historical feature-extraction rule of the combination and the values for the hyperparameters of the historical ML model of the combination from the ML database. In a first iteration, the model ranking module 310 uses these values to process the test interaction dataset 302 and estimate a performance metric. In a next iteration, one or all of the values are updated to re-process the test interaction dataset 302 and re-estimate the performance metric. By doing so over multiple iterations, the model ranking module 310 tracks changes to the values and resulting changes to the performance metric. The model ranking module 310 then identifies the maximum of the performance metric and the associated values. If the associated values are different from the initial values used for the parameters of the historical feature-extraction rule, this rule is updated to use the associated values, thereby resulting in a new feature-extraction rule in the combination. However, if the initial values resulted in the maximum performance, no update to the historical feature-extraction rule is made in the combination. Similarly, if the associated values are different from the initial values used for the hyperparameters of the historical ML model, this model is updated to use the associated values, thereby resulting in a new ML model in the combination. However, if the initial values resulted in the maximum performance, no update to the historical ML is made in the combination.

This iterative process can become computationally burdensome as the number of combinations and the number of possible value variations increase. To reduce this burden, a non-exhaustive search is used. For example, a Bayesian optimization algorithm is used. In another example, the search may stop upon a determination of a combination having a performance better than the specified performance metric. In addition, when iteratively varying the parametric values of a combination, the variations can be stopped once a peak performance is detected or if the change to the performance of the combination of the iterations is not significant (e.g., bounces within a range or is smaller than a threshold value).

Figure 4:
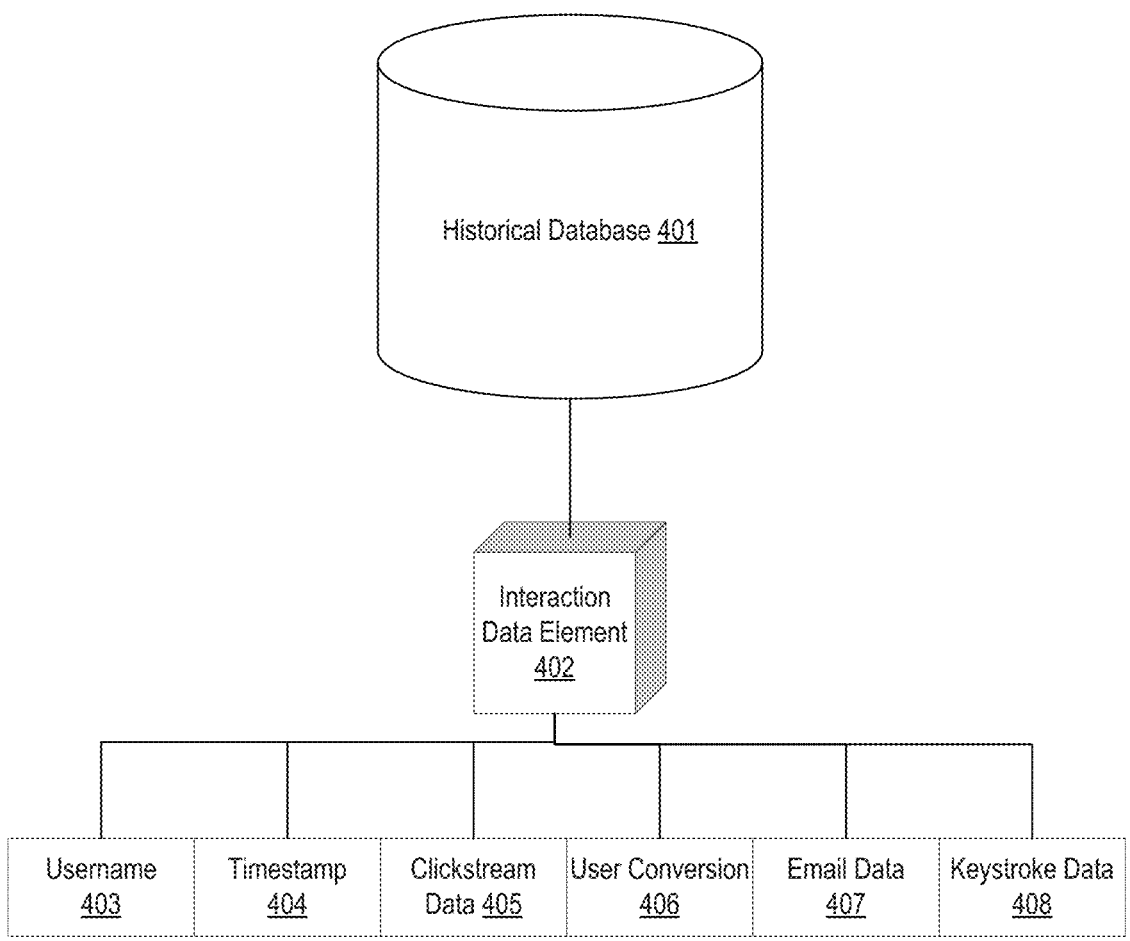
FIG. 4 depicts examples of interaction data elements within a historical interaction datasets, according to certain embodiments of the present disclosure.

FIG. 4 depicts an example of an interaction data element within a historical database of interaction data, according to certain embodiments of the present disclosure. For example, a historical database 401 may be stored on an ML server, such as, for example the ML server 320. The historical database 401 may contain at least an interaction data element 402. The historical database 401 may be a database, or additionally, it may be a structure for storing individual databases and is not limited to a singular database construction. An interaction data element 402 may be a data element which is a component of the historical interaction data 312. In some embodiments, an interaction data element 402 may be defined as an array for storing interaction data values in a related set interaction data element 402. For a non-limiting example, username 403, timestamp 404, clickstream data 405, user conversion 406, email data 407, or keystroke data 408, may represent data values within the interaction data element 402. Additionally, interaction data element 402 is not limited to the example of an array, but may also be any suitable data structure for storing interaction data values. Non-limiting examples of alternative embodiments for interactive data element 402 include tables, indexes, B+ trees, or databases.

Figure 5:
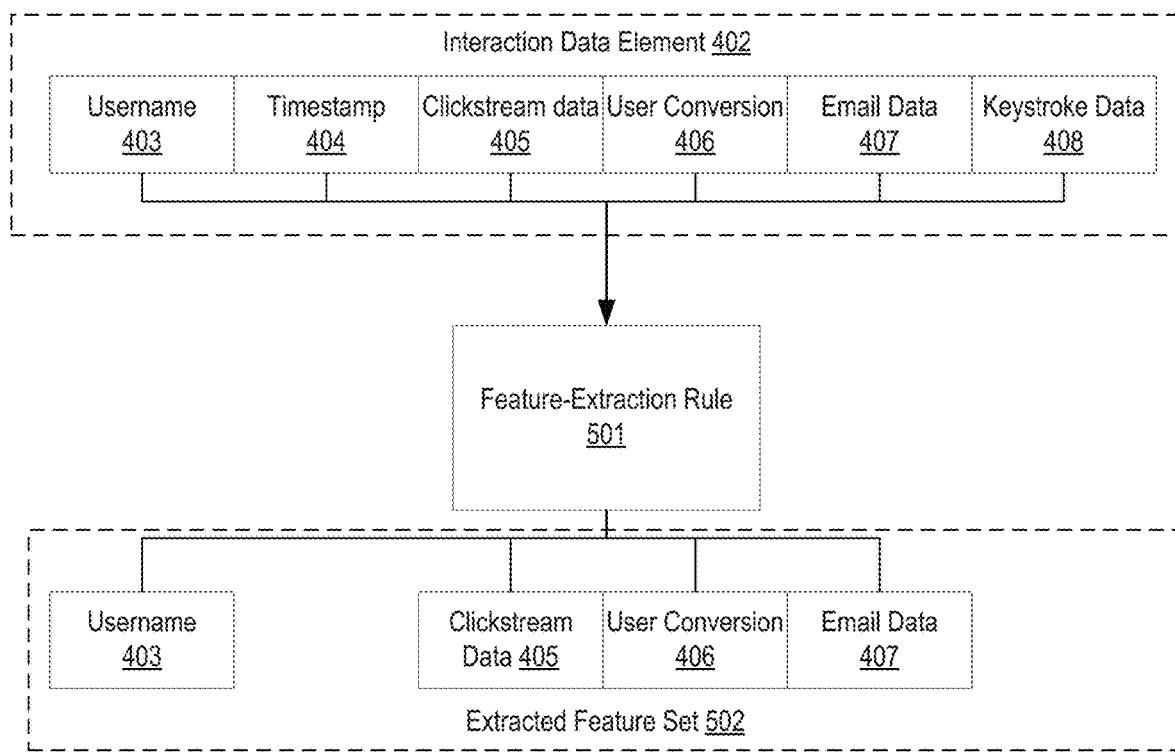
FIG. 5 depicts an example of a feature-extraction rule for extracting interaction data elements, according to certain embodiments of the present disclosure.

FIG. 5 depicts an example of a feature-extraction rule 501 extracting interaction data elements, such as the interaction data element 402, according to certain embodiments of the present disclosure. As illustrated, the interaction data element 402 contains a plurality of interaction data values, such as values username 403, timestamp 404, clickstream data 405, user conversion 406, email data 407, or keystroke data 408. The feature-extraction rule 501 contains information related to the selection of interaction data values from the interactive data element 402. The feature-extraction rule 501 is applied to the interaction data element 402 to create an extracted feature set 502 comprising username 403, clickstream data 405, user conversion 406, and email data 407. Extracted feature set 502 represents a transformation of interaction data element 402 for use in a ML model. In additional or alternative embodiments, the extracted feature set 502 may have any number of features as determined by the application of the interaction data element 402 and the feature-extraction rule 501.

Figure 6:
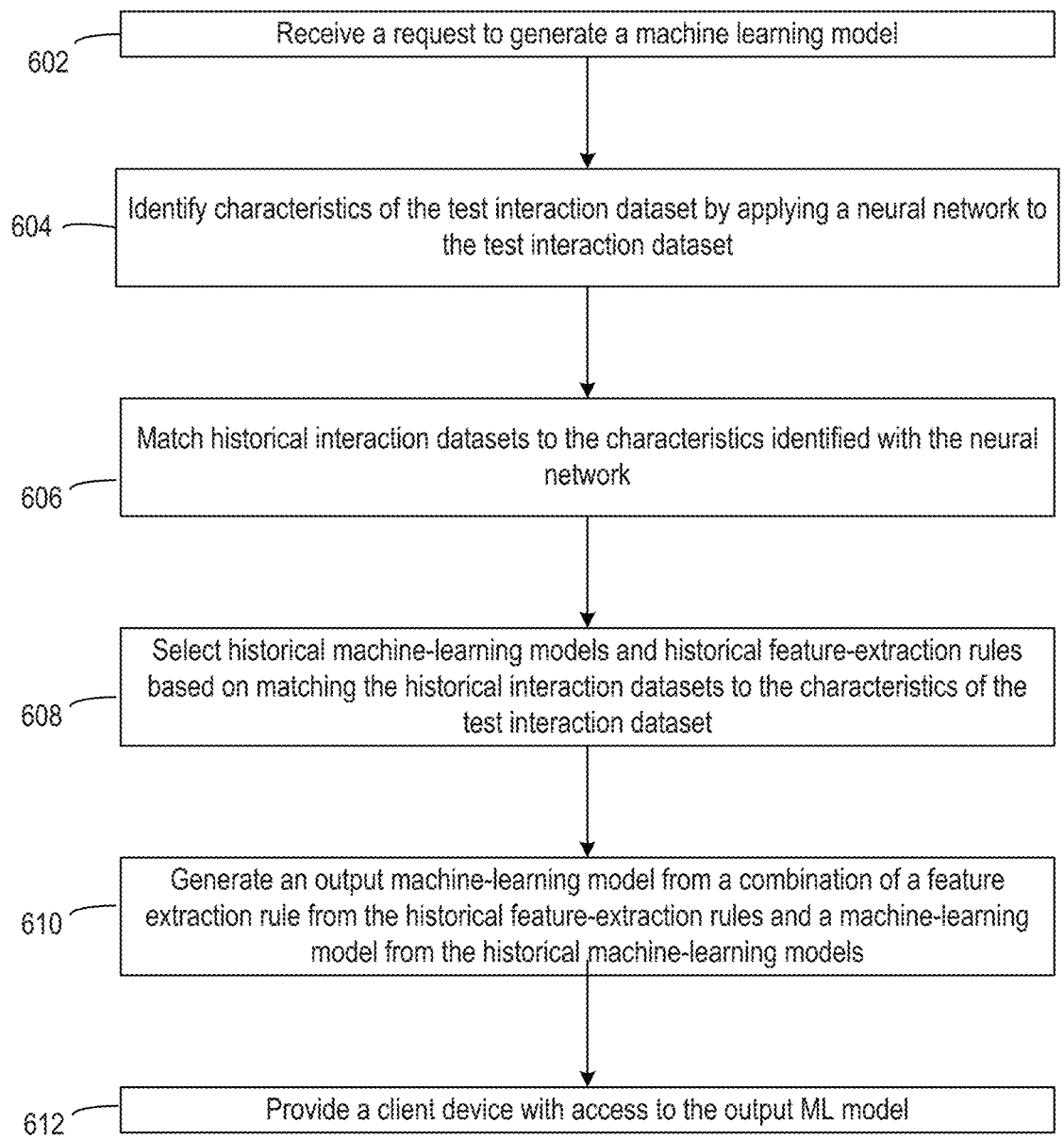
FIG. 6 depicts an example of a method for developing a new machine learning design, according to certain embodiments of the present disclosure.
Figure 7:
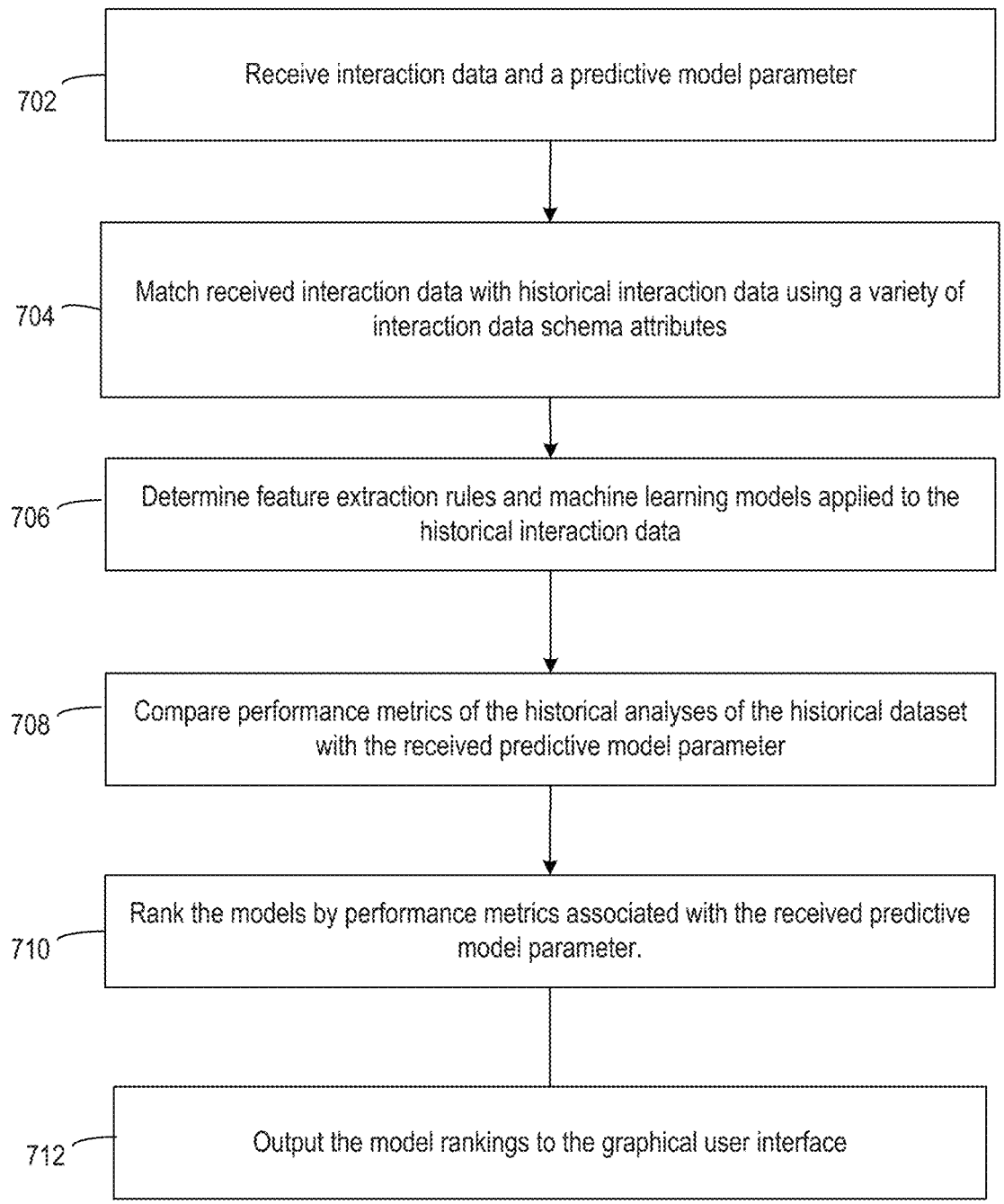
FIG. 7 depicts an example of a method for determining an optimal machine learning model based on historical interaction data, according to certain embodiments of the present disclosure.
Figure 8:
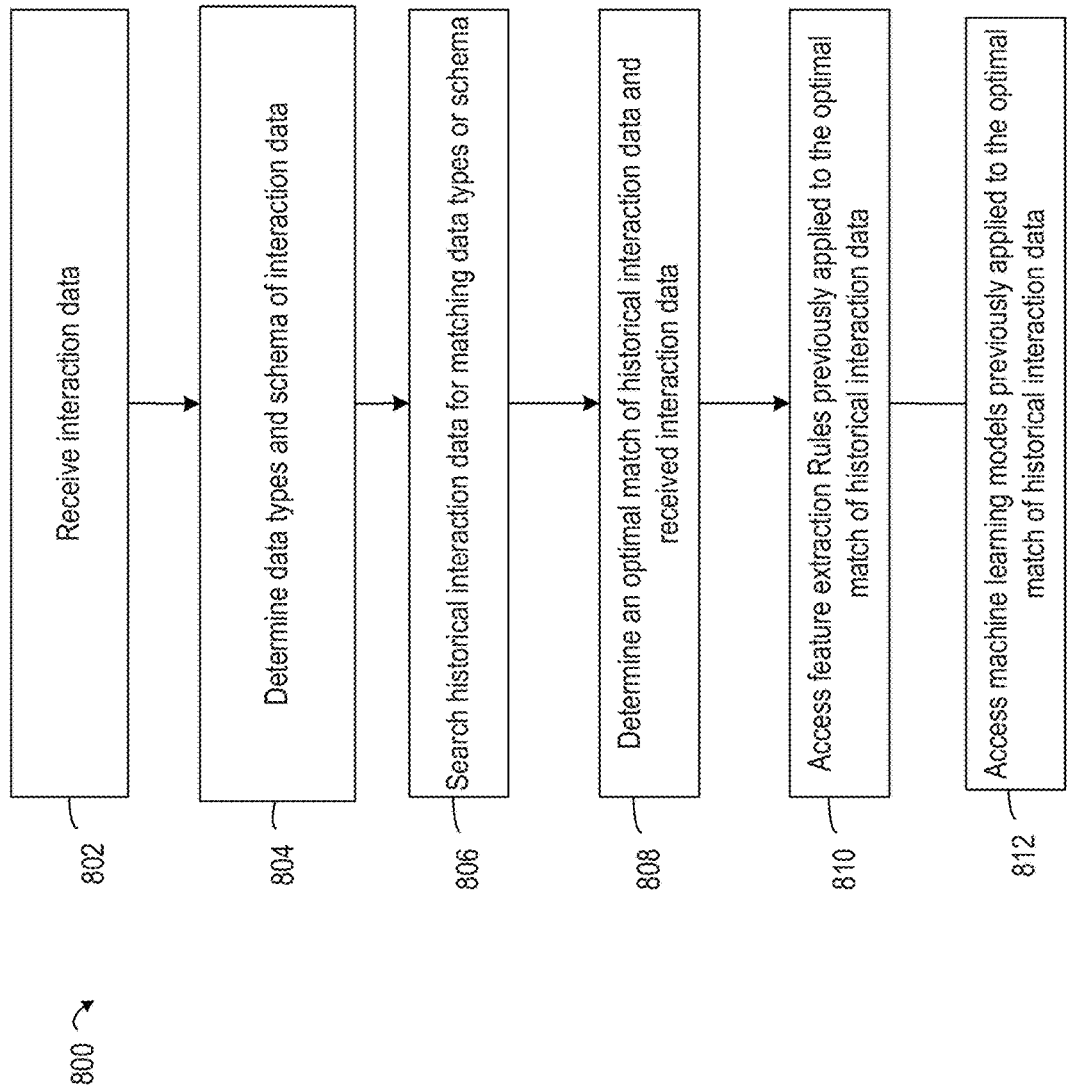
FIG. 8 depicts an example of a method for matching interaction data received with historical interaction data, according to certain embodiments of the present disclosure.

FIGS. 6-8 illustrate example of a methods generating a new ML design according to embodiments of the present disclosure. A computer system is illustrated as performing the operations of the example of a methods. In an example, the computer system includes an ML server that hosts an ML service, such as the ML server 104 of FIG. 1 or the ML server 320 of FIG. 3. Instructions for performing the operations of the illustrative flows can be stored as computer-readable instructions on a non-transitory computer-readable medium of the computer system. As stored, the instructions represent programmable modules that include code or data executable by a processor(s) of the computer system. The execution of such instructions configures the computer system to perform the specific operations shown in the figures and described herein. Each programmable module in combination with the processor represents a means for performing a respective operation(s). While the operations are illustrated in a particular order, it should be understood that no particular order is necessary and that one or more operations may be omitted, skipped, and/or reordered. Further, some of the operations are similar between the flows. In the interest of brevity, the similarities are not repeated FIG. 6 depicts an example of method 600 for developing a new machine learning design, according to certain embodiments of the present disclosure. The example of a method 600 includes an operation 602, where the computer system receives a request to generate an ML model. In some embodiments, the request identifies a task for the ML model. In additional or alternative embodiments, the request identifies a performance metric for the ML model. In addition, the request includes a test interaction dataset, or alternatively, this test interaction dataset is received separately from the request. In both cases, the test interaction dataset includes data corresponding to user interactions with online resources. The request and the test interaction dataset are received from a client via a user interface provided by the computer system to the client.

At operation 604, the computer system identifies characteristics of the test interaction dataset by applying a neural network to the test interaction dataset. The neural network can be trained to recognize one or more of metadata, datatypes, and data distributions in interaction datasets. For instance, the dataset matching engine 308 can use a neural network that is trained to identify various characteristics of the test interaction dataset, as described above with respect to FIG. 3.

At operation 606, the computer system matches historical interaction datasets to the characteristics identified with the neural network. In an example, the computer system matches the test interaction dataset with historical interaction datasets available from a data storage (e.g., memory of the ML server 320 or the historical database 401).

At operation 608, the computer system selects historical ML models and historical feature-extraction rules based on matching the historical interaction datasets to the characteristics of the test interaction dataset. The historical ML models can be models that were previously applied to the historical interaction datasets. The historical feature-extraction rules can be rules that were previously used to extract portions of the historical interaction datasets as inputs to the historical ML models. For instance, the computer system also identifies historical feature-extraction rules and historical ML models associated with the historical interaction datasets available from the data storage. The historical feature-extraction rules form a candidate rule set. The historical ML models form a candidate model set. The associations between the historical interaction datasets, the historical feature-extraction rules, and the historical ML models are stored in the data storage and may not be one-to-one associations. For instance, a first historical feature-extraction rule and a first historical ML model may have been used with a first historical interaction dataset. In comparison, a second historical feature-extraction rule and the first historical ML model may have been used with a second historical interaction dataset. Accordingly, forming the two candidate sets may also include determining these associations from the data storage.

Further, the computer system selects a subset of the historical ML models from the candidate model set based on the task and the performance metric identified in the request. This can be part of the filtering applied to select potentially good performing ML models. For instance, the computer system compares tasks of the historical ML models from the candidate model set and the task identified in the request and compares performance metrics of these models and the performance metric identified in the request. Ones that have matching tasks and acceptable performance metrics (e.g., better than the specified performance metric or better than a relaxed performance threshold) are added to the candidate model subset.

In addition, the computer system generates combinations of the historical feature-extraction rules from the candidate rule set and the ML models from the subset. Each of the combinations includes a historical feature-extraction rule from the candidate rule set and a historical ML model from the candidate model subset. The various combinations represent the search space.

At operation 610, the computer system generates an output ML model from a combination of a feature-extraction rule from the historical feature-extraction rules and a ML model from the historical ML models. The output ML model can be generated based on the combination satisfying a performance metric included in the request For instance, the computer system identifies an optimal ML model and feature-extraction rule (e.g., an optimal combination) from the search space. In an example, the computer system generates, a performance metric for each of the combinations based on an extraction of features from the test interaction dataset according to the historical feature-extraction rule of the combination and a performance of the task on the test interaction dataset by the historical ML model of the combination according to the features. As explained herein above, generating the performance metric of each combination can be an iterative process that includes searching for a maximum of the performance metric for that combination by iteratively changing the values for rule parameters of the feature-extraction rule or values of the model parameters (e.g., hyperparameters) of the historical feature ML model, thereby generating a new feature extracting rule or a new ML model for the combination.

In a simplified example, the computer system generates a first test output by extracting a first feature set from the test interaction dataset with a first historical feature-extraction rule and applying a first historical ML model to the first feature set. The computer system also generates a second test output by extracting a second feature set from the test interaction dataset with a second historical feature-extraction rule and applying a second historical ML model to the second feature set. The computing system determines that the first test output fails to meet the performance metric and that the second test output satisfies the performance metric. The computing system builds an output ML model from the second historical feature-extraction rule and the second historical ML model. For instance, the output ML model can include a modified version of the second historical ML model having one or more updated model parameters that resulted in the second test output satisfying the performance metric.

To illustrate, and focusing on one of the combination, the computer system identifies, from the data storage, a rule parameter for the historical feature-extraction rule of the combination and a model parameter for the historical ML of the combination. The computer system also determines a value of the rule parameter (e.g., a first value) as used in the historical interaction dataset and a value of the model parameter (e.g., a second value) as used in the historical interaction dataset. Thereafter, the computer system iteratively determines the performance metric by at least, in each iteration, changing the first value or the second value and applying the historical feature-extraction rule and the historical ML model to the test interaction dataset according to the first value and the second value.

To reduce the computational burden, the computer system stops the iterative determination of the performance metric based on a determination that a change to the performance metric of the combination between iterations is within a threshold value (e.g., does no longer change more than 0.1% between the iterations). Additionally or alternatively, the computer system stops the iterative determination of the performance metric based on identifying a maximum of the performance metric (e.g., by detecting a peak). Otherwise, the iterations are repeated for a predefined maximum number of iterations.

Once the iterations are completed or stopped, the computer system sets the first value of the rule parameter and the second value of the ML parameter based on the maximum of the performance metric determined for the combination. Accordingly, the combination may be changed to include the new feature-extraction rule and the new ML mode. More specifically, the computer system updates, as applicable, the historical feature-extraction rule in the combination to generate the new feature-extraction rule by at least editing the first value of the rule parameter and updates, as applicable, the historical ML model in the combination to generate the new ML model by at least editing the second value of the model parameter.

At operation 612, provides the client device with access to the output ML model. In some embodiments, the computer system stores the output ML model in a memory device accessible to one or more processing devices of the computer system. The computer system transmits a notification from the one or more processing devices to the client device. The notification indicates that the client device has access to the memory device that stores the output ML model.

In some embodiments, the computer system outputs information (e.g., the notification from the example above) about an output ML model (e.g., an optimal ML model) to the client. For example, the computer system selects a subset of the combinations based on a comparison of the performance metrics generated for the combinations in the subset to the performance metrics generates for the remaining combinations (e.g., may select the three best performing combinations or the top performing combination). The computer system provides information about each of the combinations in the subset. The information about a combination describes the feature-extraction rule and the ML model of the combination and includes an option to download the combination and an option to run the combination. Upon receiving a selection of the download option from the client, the computer system provides to the client the feature-extraction rule and the ML model such that the client can use from that point on independently of the computer system. Upon receiving a selection of the run option from the client and new test interaction dataset, as applicable, the computer system provides an output of performing the task on the new test interaction dataset based on the feature-extraction rule and the ML model.

FIG. 7 depicts an example of a method 700 for determining an optimal ML model based on historical interaction data, according to certain embodiments of the present disclosure. The method 700 includes operation 702, where the computer system receives interaction data and a predictive task. In an example, the interaction data and the predictive task that are received include the test interaction dataset 302 and the ML model description 303.

At operation 704, the computer system matches the received interaction data with at least one portion of historical interaction data using a variety of interaction data schema attributes. For instance, the ML service 306 may use the dataset matching engine 308 to search the historical interaction data 312 using datatype, schema, or metadata. For example, dataset matching engine 308 may use columns of a certain data type such as strings, signed or unsigned numbers. In some embodiments, the dataset matching engine 308 may use the schema of the historical interaction data 312 and a schema of the test interaction dataset 302 to perform matching operations. In additional or alternative embodiments, the dataset matching engine 308 may use metadata of the historical interaction data 312 and the test interaction dataset 302 to perform matching operations. For example, a non-limiting example of metadata could include a description of the dataset, or source information, or other types of metadata.

At operation 706, the computer system determines feature-extraction rules and ML models applied to the historical interaction data. For instance, the ML service 306 may use the model performance evaluation engine 309 to process the matched historical interaction data 312 from operation 604. In some embodiments, the model performance evaluation engine 309 searches a ML database for a historical feature-extraction rule 314 or historical ML model 316 that corresponds to a matched portion of the historical interaction data 312. In additional or alternative embodiments, the model performance evaluation engine 309 searches multiple sets of matching historical interaction data 312 for multiple historical feature-extraction rules 314 and historical ML models 316. For a non-limiting example, a particular dataset of historical interaction data 312 may have three historical feature-extraction rules 314 used with four historical ML models 316. In this example, the model performance evaluation engine 309 would return twelve combinations of candidate models and feature-extraction rules for comparison. In some embodiments, any number of combinations for candidates are possible. In additional or alternative embodiments, the ML service 306 may provide a limit on how many candidates may be compared.

At operation 708, the computer system compares performance metrics of the analyses of a historical interaction dataset with a performance metric specified in the ML model description 303. For instance, the model performance evaluation engine 309 may compare combinations of candidate historical ML models 316 and historical feature-extraction rules 314. In some embodiments, the model performance evaluation engine 309 may access a historical performance metric 318 corresponding to a particular combination of a historical ML model 316 and a specific historic feature-extraction rule 314. A historical performance metric 318 can be a metric associated with the performance of a discrete combination of a historical ML model 316 and historical feature-extraction rule 314. Non-limiting examples of historical performance metrics 318 can be an accuracy percentage, a recall rate, a precision value, or a specificity, or a range of any of these values. The model performance evaluation engine 309 may compare the historical performance metric 318 to the specified one from the ML model description 303. The model performance evaluation engine 309 determines if the candidate combination is acceptable based at least in part on a predictive model parameter included in the ML model description 303. In additional or alternative embodiments, the model performance evaluation engine 309 may apply multiple historical performance metrics 318 in comparison with the ML model description 303. In an embodiment where at least one historical performance metric 318 is determined unacceptable based at least in part on comparison with a predictive model parameter included in the ML model description 303, the model performance evaluation engine may adjust the predictive model parameter to find a suitable historical performance metric 318. For a non-limiting example, a predictive model parameter of accuracy rate 80% is received. Model performance evaluation engine 309 compares all candidates and finds the highest value of any historical performance metric 318 is 75%, the model performance evaluation engine 309 may determine this example to be a match of the performance metric specified in the ML model description 303.

At operation 710, the computer system ranks the candidate models by performance metrics. As illustrated in connection with FIG. 6, the performance metrics of the different combinations are estimated and can be used to rank the candidate models.

At operation 712, the computer system outputs the model rankings to the GUI 201. For instance, the ML services 306 may output the ranking generated at operation 710. In this output may identify only a number of the combinations (e.g., the three best performing combinations or the top performing combination) depending on a user setting received at the GUI 201. For example, the user setting may specify this number.

FIG. 8 depicts an example of a method 800 for matching interaction data received with historical interaction data, according to certain embodiments of the present disclosure. The method 800 includes an operation 802, where the computer system receives interaction data, such as the test interaction dataset 302.

At operation 804, the computer system datatypes and schema of the interaction data, such as the test interaction dataset 302. For instance, the dataset matching engine 308 may identify datatypes or a schema of the test interaction dataset 302. In some embodiments, dataset matching engine 308 can perform an analysis to determine a specific data structure that characterizes the test interaction dataset 302. For non-limiting examples, a data structure can include, but is not limited to columns, tables, databases, vectors, matrices, or other data storage structures. The data structure can also include encoded or compressed data structures such as may be used for storage of other information types. The dataset matching engine 308 determines a schema based on the organizational structure of the identified datatypes. The dataset matching engine 308 may determine a match based on any combination of schema or datatype elements. The dataset matching engine 308 can also weight the determination in favor of certain characteristics based on historical experience with dataset matching.

At operation 806, the computer system searches historical interaction data for matching datatypes or schema. For instance, the dataset matching engine 308 can access the historical interaction data 312, stored on a historical data database. In some embodiments, the dataset matching engine 308 accesses historical interaction data 312 and analyzes datatype or schema corresponding to a particular dataset of historical interaction data 312. The dataset matching engine 308 can perform comparison of the schema and datatypes identified within the test interaction dataset 302 to each of the historical interaction data 312. In some embodiments, the dataset matching engine 308 determines at least one set of historical interaction data 312 that is a match to the datatypes or schema of the test interaction dataset 302. In additional or alternative embodiments where a matching historical interaction data 312 is not determined to be an acceptable match, the dataset matching engine 308 may determine the most similar datatypes or schema and determine a match to the test interaction dataset 302.

At operation 808, the computer system determines an optimal match of the historical interaction data 312 and the test interaction dataset 302. For instance, the dataset matching engine 308 determines a set of matching historical interaction data 312 to the test interaction dataset 302. In some embodiments, dataset matching engine 308 can determine multiple possible matches based on datatype, schema, metadata, or other factors. The dataset matching engine 308 can determine an optimal match based on the similarity measures. In some embodiments, the dataset matching engine 308 may rank multiple sets of matching historical interaction data 312 to determine the most similar match to the test interaction dataset 302.

At operation 810, the computer system accesses feature-extraction rules previously applied to the optimal match of historical interaction data, such as historical feature-extraction rules 314 applied to historical interaction data 312.

At operation 812, the computer system accesses ML models previously applied to the optimal match of historical interaction data 312. One or more computing devices execute program code from ML service 306 to implement operation 812. For instance, the dataset matching engine 308 can access a historical usage of a historical ML model 316 associated with the historical interaction data 312 that is the optimal match to the test interaction dataset 302.

Figure 9:
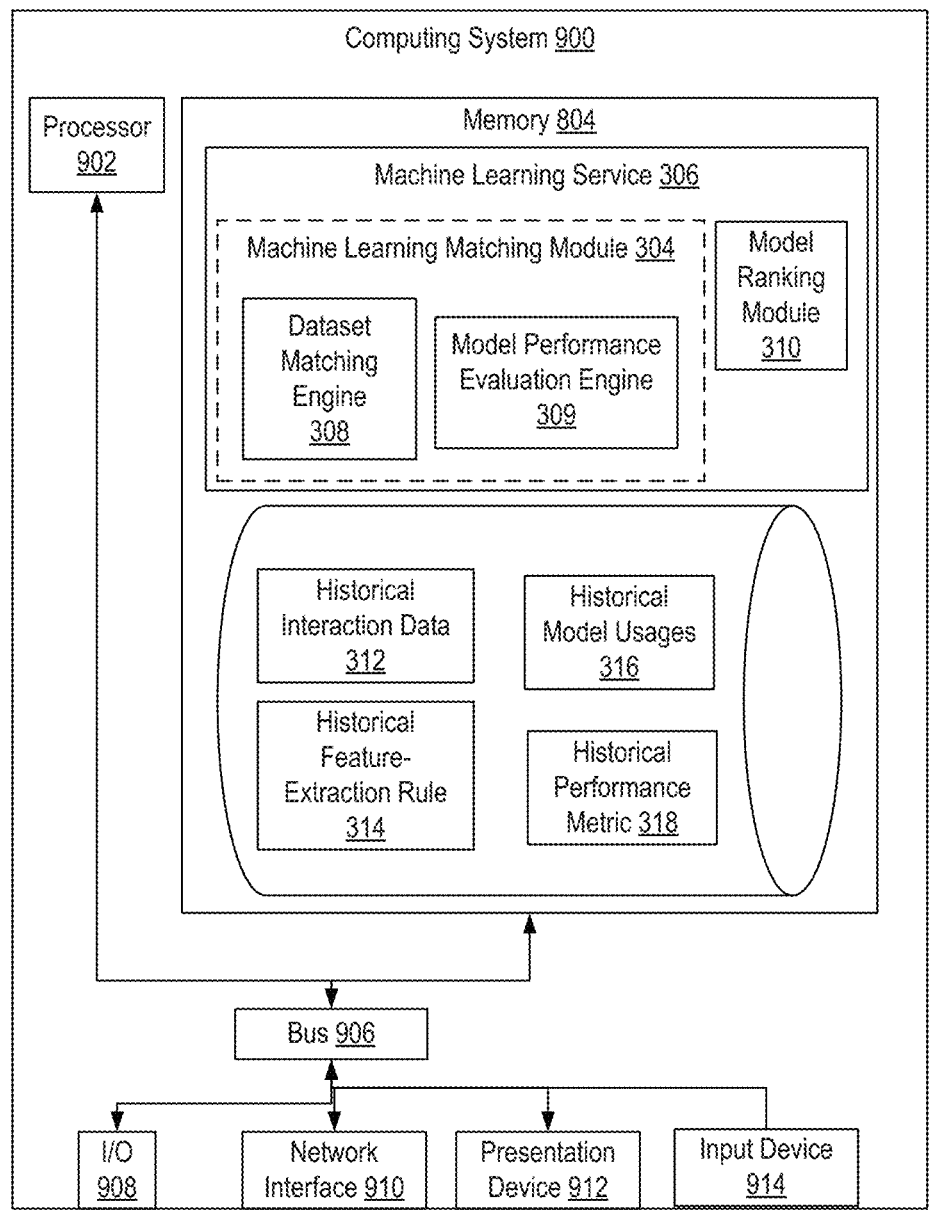
FIG. 9 depicts an example of a computer system, according to certain embodiments of the present disclosure.

Any suitable computer system or group of computer systems can be used for performing the operations described herein. For example, FIG. 9 depicts an example of a computer system 900 that can implement the computing environment of FIG. 1. In some embodiments, the computer system 900 includes a processing device that executes the ML service 306 as well as any applications for ML matching module 304, a memory that stores various machine learning data, an input device 914 (e.g., a mouse, a keyboard, a touchpad, a touchscreen, etc.), and a presentation device 912 that displays graphical content (e.g., GUI 201, the output ranked model 322, etc.). In other embodiments, different computing systems (e.g., an ML server 320) having devices similar to those depicted in FIG. 9 (e.g., a processor, a memory, etc.) perform one or more of executing the ML service 306, storing the machine learning data, receiving input, evaluating models, and displaying the various outputs.

The depicted example of a computer system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computer system 900 may also include a number of external or internal devices, an input device 914, a presentation device 912, or other input or output devices. For example, the computer system 900 is shown with one or more input/output ("I/O") interfaces 908. An I/O interface 908 can receive input from input devices or provide output to output devices. One or more buses 906 are also included in the computer system 900. The bus 906 communicatively couples one or more components of a respective one of the computer system 900.

The computer system 900 executes program code that configures the processor 902 to perform one or more of the operations described herein. The program code includes, for example, the ML service 306 or other suitable applications that perform one or more operations described herein. The program code may be resident in the memory device 904 or any suitable computer-readable medium and may be executed by the processor 902 or any other suitable processor. In some embodiments, all modules in the ML service 306 (e.g., dataset matching engine 308, model performance evaluation engine 309, model ranking module 310, etc.) are stored in the memory device 904, as depicted in FIG. 9. In additional or alternative embodiments, one or more of these modules from the ML service 306 are stored in different memory devices of different computing systems.

In some embodiments, the computer system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computer system 900 is able to communicate with one or more other computing devices (e.g., a computing device executing an ML service 306) via a data network using the network interface device 910.

In some embodiments, the computer system 900 also includes the input device 914 and the presentation device 912 depicted in FIG. 9. An input device 914 can include any device or group of devices suitable for receiving visual, auditory, or other suitable input that controls or affects the operations of the processor 902. Non-limiting examples of the input device 914 include a touchscreen, a mouse, a keyboard, a microphone, a separate mobile computing device, etc. A presentation device 912 can include any device or group of devices suitable for providing visual, auditory, or other suitable sensory output. Non-limiting examples of the presentation device 912 include a touchscreen, a monitor, a speaker, a separate mobile computing device, etc.

Although FIG. 9 depicts the input device 914 and the presentation device 912 as being local to the computing device that executes the ML service 306, other implementations are possible. For instance, in some embodiments, one or more of the input device 914 and the presentation device 912 can include a remote client-computing device that communicates with the computer system 900 via the network interface device 910 using one or more data networks described herein.

In some embodiments of generating machine-learning models, one or more processors 902 of the computing system 900 perform various operations. These operations include receiving, from a client device, a request to generate a machine-learning (ML) model. The request identifies a test interaction dataset and a task for the ML model. These operations also include identifying characteristics of the test interaction dataset by applying, to the test interaction dataset, a neural network trained to recognize one or more of metadata, datatypes, and data distributions in interaction datasets. These operations also include matching historical interaction datasets to the characteristics identified with the neural network. These operations also include selecting, based on matching the historical interaction datasets to the characteristics of the test interaction dataset, historical ML models, which were previously applied to the historical interaction datasets, and historical feature-extraction rules, which were previously used to extract portions of the historical interaction datasets as inputs to the historical ML models. These operations also include generating an output ML model from a combination of (i) a feature-extraction rule from the historical feature-extraction rules and (ii) a ML model from the historical ML models. The output ML model is generated based on the combination satisfying a performance metric included in the request. These operations also include providing the client device with access to the output ML model.

In some embodiments of generating machine-learning models, one or more processors 902 of the computing system 900 perform additional or alternative operations. These operations include receiving, from a client device, a request to generate a ML model. The request identifies a test interaction dataset and a performance metric for the ML model. These operations also include selecting, with a neural network, (i) historical ML models previously applied to historical interaction datasets similar to the test interaction dataset and (ii) historical feature-extraction rules previously used to extract portions of the historical interaction datasets as inputs to the historical ML models. These operations also include generating a first test output by (i) extracting a first feature set from the test interaction dataset with a first historical feature-extraction rule and (ii) applying a first historical ML model to the first feature set. The first test output fails to meet the performance metric. These operations also include generating a second test output by (i) extracting a second feature set from the test interaction dataset with a second historical feature-extraction rule and (ii) applying a second historical ML model to the second feature set. The second test output satisfies the performance metric. These operations also include building an output ML model from the second historical feature-extraction rule and the second historical ML model. These operations also include storing the output ML model in a memory device accessible to the one or more processing devices. These operations transmitting a notification from the computer system 900 to the client device. The notification indicates that the client device has access to the memory device that stores the output ML model.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for generating machine-learning models, wherein the method includes one or more processing devices performing operations comprising:
receiving, from a client device, a request to generate a machine-learning (ML) model, wherein the request identifies a test interaction dataset and a task for the ML model;
identifying characteristics of the test interaction dataset by applying, to the test interaction dataset, a neural network, wherein the characteristics comprise one or more of metadata, datatypes, and data distributions in interaction datasets, wherein the neural network is trained to recognize one or more of the metadata, the datatypes, and the data distributions in the interaction datasets, and wherein the neural network is separate from the ML model;
searching historical interaction datasets that match the characteristics identified by the neural network;
selecting, based on the historical interaction datasets that match the characteristics of the test interaction dataset:
(i) a plurality of historical ML models that were previously applied to the historical interaction datasets, and
(ii) historical feature-extraction rules that were previously used to extract portions of the historical interaction datasets as inputs to the plurality of historical ML models;
generating an output ML model from a combination of (i) a feature-extraction rule from the historical feature-extraction rules and (ii) an ML model from the plurality of historical ML models, wherein the output ML model is generated based on the combination satisfying a performance metric included in the request; and
providing the client device with access to the output ML model.

2. The method of claim 1, wherein generating the output ML model comprises selecting the ML model from the plurality of historical ML models by:
comparing the task identified in the request to respective tasks of the plurality of historical ML models; and
comparing the performance metric included in the request to respective performance metrics of the plurality of historical ML models.

3. The method of claim 1, wherein the feature-extraction rule specifies an extraction of features based on a rule parameter, wherein a historical ML model performs the task based on a model parameter,
wherein the operations further comprise identifying, from a data storage, the rule parameter and the model parameter, wherein the data storage stores the historical feature-extraction rules, and the plurality of historical ML models.

4. The method of claim 3, generating the output ML model comprises iteratively updating parameters of the combination by, in each iteration:
generating (i) an updated feature-extraction rule by changing a first value for the rule parameter and (ii) an updated ML model by changing a second value for the model parameter; and
applying the updated feature-extraction rule and the updated ML model to the test interaction dataset according to the first value and the second value.

5. The method of claim 4, further comprising stopping the iterative updating based on a determination that a change to a performance of the updated ML model between iterations is within a threshold value.

6. The method of claim 4, further comprising stopping the iterative updating based on determining a maximum performance of the updated ML model.

7. The method of claim 4, further comprises:
setting the first value of the rule parameter and the second value of the model parameter based on a maximum performance of the updated ML model.

8. The method of claim 4, wherein providing the client device with access to the output ML model comprises:
providing an option to download the combination; and
transmitting, to the client device, the updated feature-extraction rule and the updated ML model based on a selection of the option to download the combination.

9. The method of claim 1, wherein providing the client device with access to the output ML model comprises:
providing an option to run the combination;
receiving a selection of the option to apply the combination to the test interaction dataset;
executing code that applies the combination to the test interaction dataset; and
providing, to the client device, an output of performing the task on the test interaction dataset with the combination.

10. The method of claim 1, further comprising selecting the combination from potential combinations based on a comparison of a performance of the output ML model to performances associated with the remaining potential combinations.

11. A method for generating machine learning (ML) models, wherein the method includes one or more processing devices performing operations comprising:
receiving, from a client device, a request to generate an ML model, wherein the request identifies a test interaction dataset and a performance metric for the ML model;
selecting, with a neural network, (i) a plurality of historical ML models previously applied to historical interaction datasets similar to the test interaction dataset and (ii) historical feature-extraction rules previously used to extract portions of the historical interaction datasets as inputs to the plurality of historical ML models, wherein the neural network is trained to recognize characteristics of interaction datasets comprising one or more of metadata, datatypes, and data distributions in the interaction datasets and the neural network is separate from the ML model;
generating a first test output by (i) extracting a first feature set from the test interaction dataset with a first historical feature-extraction rule and (ii) applying a first historical ML model to the first feature set, wherein the first test output fails to meet the performance metric;

generating a second test output by (i) extracting a second feature set from the test interaction dataset with a second historical feature-extraction rule and (ii) applying a second historical ML model to the second feature set, wherein the second test output satisfies the performance metric;

building an output ML model from the second historical feature-extraction rule and the second historical ML model;

storing the output ML model in a memory device accessible to the one or more processing devices; and transmitting a notification from the one or more processing devices to the client device, wherein the notification indicates that the client device has access to the memory device that stores the output ML model.

12. The method of claim 11, wherein selecting the historical feature-extraction rules comprises determining that each historical feature-extraction rule was used with one or more of the plurality of historical ML models, wherein the determination is based on associations between the historical feature-extraction rules, and the plurality of historical ML models.

13. The method of claim 12, wherein:
the associations, the historical feature-extraction rules, and the plurality of historical ML models are stored in a data storage,
the historical feature-extraction rule specifies an extraction of features based on a rule parameter,
a historical ML model performs a task based on a model parameter, and
the operations further comprise identifying, from the data storage, the rule parameter and the model parameter.

14. The method of claim 11, further comprising matching the test interaction dataset with the historical interaction datasets by matching, based on a neural network, a header from a schema of the test interaction dataset with a header of a shared schema of the historical interaction datasets.

15. The method of claim 11, further comprising matching the test interaction dataset with the historical interaction datasets by matching, based on a neural network, entries from the test interaction dataset with entries in the historical interaction datasets.

16. A computer system comprising:
means for receiving, from a client device, a request to generate a machine-learning (ML) model, wherein the request identifies a test interaction dataset and a task for the ML model;
means for identifying characteristics of the test interaction dataset by applying, to the test interaction dataset, a neural network, wherein the characteristics comprise one or more of metadata, datatypes, and data distributions in interaction datasets, wherein the neural network is trained to recognize one or more of the metadata, the datatypes, and the data distributions in the interaction datasets, and wherein the neural network is separate from the ML model;
means for matching historical interaction datasets to the characteristics identified with the neural network;
means for selecting, based on matching the historical interaction datasets to the characteristics of the test interaction dataset:
(i) a plurality of historical ML models that were previously applied to the historical interaction datasets, and
(ii) historical feature-extraction rules that were previously used to extract portions of the historical interaction datasets as inputs to the plurality of historical ML models;
means for generating an output ML model from a combination of (i) a feature-extraction rule from the historical feature-extraction rules and (ii) an ML model from the plurality of historical ML models, wherein the output ML model is generated based on the combination satisfying a performance metric included in the request; and
means for providing the client device with access to the output ML model.

17. The computer system of claim 16, wherein generating the output ML model comprises selecting the ML model from the plurality of historical ML models by:
comparing the task identified in the request to respective tasks of the plurality of historical ML models; and
comparing the performance metric included in the request to respective performance metrics of the plurality of historical ML models.

18. The computer system of claim 16, wherein the feature-extraction rule specifies an extraction of features based on a rule parameter, wherein a historical ML model performs the task based on a model parameter,
wherein the computer system further comprises means for identifying, from a data storage, the rule parameter and the model parameter, wherein the data storage stores the historical feature-extraction rules, and the plurality of historical ML models.

19. The computer system of claim 18, wherein generating the output ML model comprises iteratively updating parameters of the combination by, in each iteration:
generating (i) an updated feature-extraction rule by changing a first value for the rule parameter and (ii) an updated ML model by changing a second value for the model parameter; and
applying the updated feature-extraction rule and the updated ML model to the test interaction dataset according to the first value and the second value.

20. The computer system of claim 19, further comprising means for one or more of:
stopping the iterative updating based on a determination that a change to a performance of the updated ML model between iterations is within a threshold value; and
stopping the iterative updating based on determining a maximum of the performance of the updated ML model.

* * * * *